(12) United States Patent
Stohling et al.

(10) Patent No.: US 8,823,231 B2
(45) Date of Patent: Sep. 2, 2014

(54) MOTOR HOLDER FOR RECEIVING AN ELECTRIC MACHINE AND ELECTRIC MACHINE

(75) Inventors: Marco Stohling, Schondra (DE); Hannelore Diller, Rottendorf (DE); Burkard Rochner, Wurzburg (DE)

(73) Assignee: Brose Fahrzeugteile GmbH & Co. Kommanditgesellschaft, Wuerzburg, Wuerzburg (DE)

( * ) Notice: Subject to any disclaimer, the term of this patent is extended or adjusted under 35 U.S.C. 154(b) by 151 days.

(21) Appl. No.: 13/516,294

(22) Filed: Jun. 15, 2012

(65) Prior Publication Data
US 2013/0154422 A1    Jun. 20, 2013

Related U.S. Application Data

(63) Continuation of application No. PCT/EP2010/069725, filed on Dec. 15, 2010.

(30) Foreign Application Priority Data

Dec. 18, 2009    (DE) .......................... 10 2009 055 013

(51) Int. Cl.
*H02K 5/10*    (2006.01)
*H02K 5/15*    (2006.01)
*F16M 5/00*    (2006.01)
*B60H 1/00*    (2006.01)
*H02K 5/00*    (2006.01)
*H02K 5/04*    (2006.01)

(52) U.S. Cl.
CPC . *H02K 5/00* (2013.01); *F16M 5/00* (2013.01); *H02K 5/10* (2013.01); *H02K 5/15* (2013.01); *B60H 1/00521* (2013.01); *H02K 5/04* (2013.01)
USPC .............................................. 310/90; 310/91

(58) Field of Classification Search
CPC .......... H02K 5/10; F16C 33/80; F16C 33/805
USPC ............... 310/90, 91; 384/144, 322, 397, 415
See application file for complete search history.

(56) References Cited

U.S. PATENT DOCUMENTS

| 4,277,114 A * | 7/1981 | Lindegger ...................... 384/144 |
| 7,078,835 B2 * | 7/2006 | Gross et al. ...................... 310/89 |
| 2008/0093937 A1* | 4/2008 | Winkler et al. .................. 310/42 |

FOREIGN PATENT DOCUMENTS

| DE | 3305297 A1 | 8/1984 |
| DE | 19521394 A1 | 12/1996 |
| JP | 2000110791 A | 4/2000 |

OTHER PUBLICATIONS

International Search Report & Opinion in PCT/EP2010/069725 dated Apr. 21, 2011.

*Primary Examiner* — John K Kim
*Assistant Examiner* — David Scheuermann
(74) *Attorney, Agent, or Firm* — Manelli Selter PLLC; Edward J. Stemberger

(57) ABSTRACT

The invention relates to a motor holder for receiving an electric machine, in particular for receiving the bearing of an electric machine, comprising a surrounding outer wall, an intermediate floor joined to the surrounding outer wall, a floor for receiving a bearing, which floor is moulded in the intermediate floor and is joined to the intermediate floor by a transitional region, the transitional region having an encircling first annular wall and at least one encircling second annular wall which form an annular storage space provided in the transitional region. The invention relates to an electric machine having a motor holder of this type.

13 Claims, 4 Drawing Sheets

MOTOR HOLDER FOR RECEIVING AN ELECTRIC MACHINE AND ELECTRIC MACHINE

This application is a continuation of International Application PCT/EP2010/069725, filed on Dec. 15, 2010.

FIELD OF THE INVENTION

The invention relates to a motor holder for receiving an electric machine and to an electric machine having a motor holder of this type.

TECHNICAL BACKGROUND OF THE INVENTION

This type of motor holder for electric machines, such as motors and/or generators are used, for example, to support motors in various motor-powered units in motor vehicles, such as air conditioning systems. Since these drive mechanisms are often located in an area of the vehicle which is exposed to external environmental conditions, such as significant temperature differences, high levels of moisture, condensation or condensation water, sprayed water, dust, salt and the like, these electric motors are not only supported by the motor holder, but are also protected against moisture and dust.

FIG. 1 shows a generally known electric machine 1 configured as a motor having a housing 2 in which an armature shaft 3 is rotatably mounted. A bearing 4 in the rear region of the motor which is designated here as the trailing end, is merely indicated in FIG. 1. In this installation position, the motor is positioned vertically, its output side, indicated here by a projecting end of the armature shaft 3, is located at the top. The bearing 4 on the trailing end is configured as a bearing bracket with a seat for a bearing box, for example a cup and ball bearing.

A motor holder 6 having a surrounding outer wall 7, an intermediate floor 8 and a floor 9 is attached to the housing 2 of the electric machine 1 around the trailing end of the electric machine to support (not described in more detail) the motor and to protect the bearing 4, and it surrounds the lower region of the motor. Below the bearing 4, the intermediate floor 8 is widened downwards by a bearing region 11 which is delimited downwards by the floor 9. The floor 9 protects the bearing 4 against external influences. However, condensation water or condensation produced by significant temperature differences, sprayed water, dust and the like, for example, can collect in the bearing region 11. These elements can then penetrate into the interior 10 of the motor holder 6 between the outer wall 7 of the motor holder 6 and the outer surface of the housing 2. Consequently, the bearing 4 with its bearing box and the end of the armature shaft 3 can come into contact with these elements and can rust in the case of moisture and wetness, for example. This is to be avoided, because the bearing 4 can become stiff due to rust, dirt and frozen moisture, and may seize up. This would impair the operation of the unit driven by the electric machine.

SUMMARY OF THE INVENTION

Against this background, it is a challenge of the present invention to provide an improved motor holder.

This object is achieved according to the invention by a motor holder having the features of claim 1 and/or by an electric machine having the features of claim 7.

Accordingly, there is provided:

A motor holder for receiving an electric machine, in particular for receiving the bearing of an electric machine, comprising a surrounding outer wall, an intermediate floor joined to the surrounding outer wall, a floor for receiving a bearing which is moulded in the intermediate floor and is joined to the intermediate floor by a transitional region, the transitional region having an encircling first annular wall and at least one encircling second annular wall which form an annular storage space provided in the transitional region.

An electric machine comprising a housing which contains an end having a bearing bracket which has a bearing which is at least partly open outwards, and comprising a motor holder according to the invention, the motor holder being arranged over the end of the housing having the bearing bracket and the bearing being arranged in the bearing region of the motor holder.

The fundamental idea of the present invention is to arrange in the motor holder a first and at least one second annular wall, as a result of which a chamber or a storage space is formed upstream of the region used for receiving the bearing, in which storage space water, dirt, drifting snow and the like, for example, can collect and thus cannot come into contact with the bearing. This chamber or storage space is closed in the radial direction. This measure prevents water, dust and the like from being able to enter from outside, particularly into the region of the motor holder provided for the bearing.

Thus, a particular advantage is also that consequently, a bearing system of an associated motor or of an electric machine is thereby easily prevented from freezing and/or rusting.

Advantageous configurations and developments of the invention are set out in the subclaims and will become apparent from the description in conjunction with the figures of the drawings.

In this respect, it is advantageous for the first and for the at least one second annular wall to be of approximately the same height. This provides a kind of labyrinth seal which can be attached to different constructions of bearings or bearing brackets without additional modifications.

In this respect, the at least one first annular wall and a portion, associated therewith, of the outer wall define a further storage space in which water, condensation water, drifting snow and dirt and also dust can collect, without penetrating inside the bearing region.

In a particularly advantageous configuration, the transitional region is provided in the transition to the intermediate floor with at least one encircling first annular wall and is provided in the transition to the floor with at least one encircling second annular wall.

If the first and at least one second annular wall define a secondary storage space with the transitional region, this secondary storage space can advantageously be used as a further collecting area for water which overflows from the outer regions. In this respect, the bearing region is kept free from and protected even more effectively against moisture and dirt.

The at least one second annular wall can define with the floor a bearing region in which the bearing to be protected of the electric machine is arranged or in which it can be arranged. This provides a very compact construction.

The first and the at least one second annular wall extend substantially in the direction of the longitudinal axis of the electric machine to approximately the same extent. Consequently, it is possible, for example when the annular walls extend to approximately the same extent, to cover and protect a large number of different types and classes of motor using the same motor holder, without having to provide different motor holders for each of these different types and classes of motor. This is a particular advantage because it is thereby possible to use the same motor holders in each case for types and classes of motors which also differ, for example, in respect of their size and a corresponding large number of different motor holders does not have to be provided. Consequently, the motor holders can be produced in greater quantities, which overall makes them even more economical.

The electric machine can be a component of an air conditioning system of a motor vehicle. The use in air conditioning systems is particularly advantageous, because moisture can form there particularly easily due to the temperature differences prevailing in the air conditioning system. However, other uses would also be possible and advantageous.

The above configurations and developments can be combined together in any manner, if appropriate. Further possible configurations, developments and implementations of the invention also include previous combinations which have not been explicitly mentioned or features of the invention which are described in the following in respect of the embodiments. In particular, a person skilled in the art will also add individual aspects as improvements or additions to the respective basic form of the present invention.

BRIEF DESCRIPTION OF THE DRAWINGS

In the following, the present invention will be described in detail with reference to the embodiments presented in the schematic figures of the drawings, in which.

In the figures of the drawings, the same and functionally identical elements and features have been provided with the same reference numerals and characters, unless indicated otherwise.

DETAILED DESCRIPTION OF EMBODIMENTS OF THE PRESENT INVENTION

Figure 1:
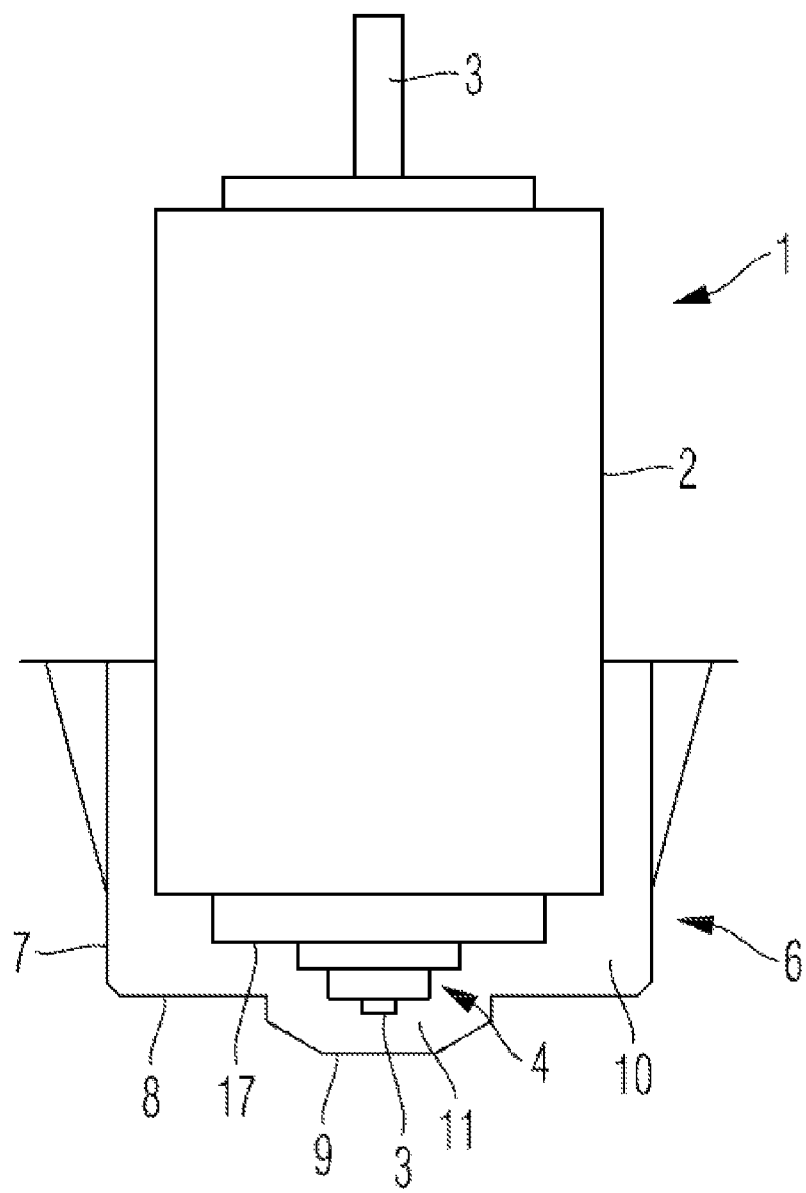
FIG. 1 is a schematic side view of a known motor holder of an electric machine.
Figure 2:
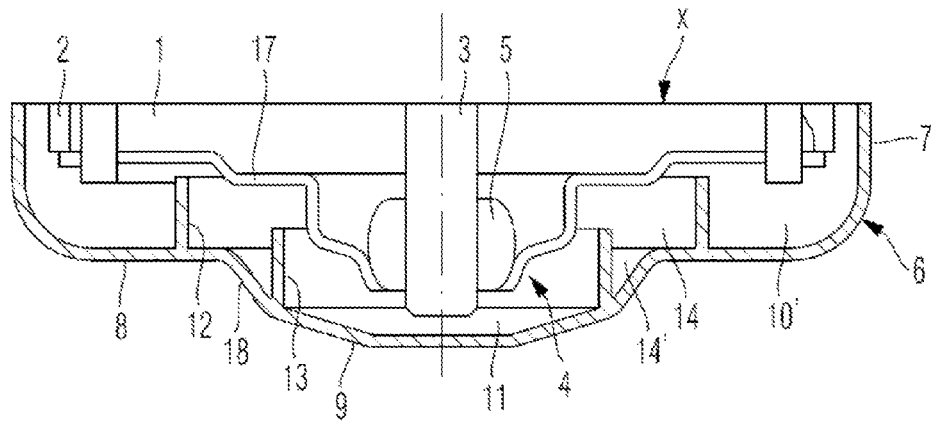
FIG. 2 is a schematic sectional view of the lower portion of a first embodiment of an electric machine and of a motor holder according to the invention.
Figure 3:
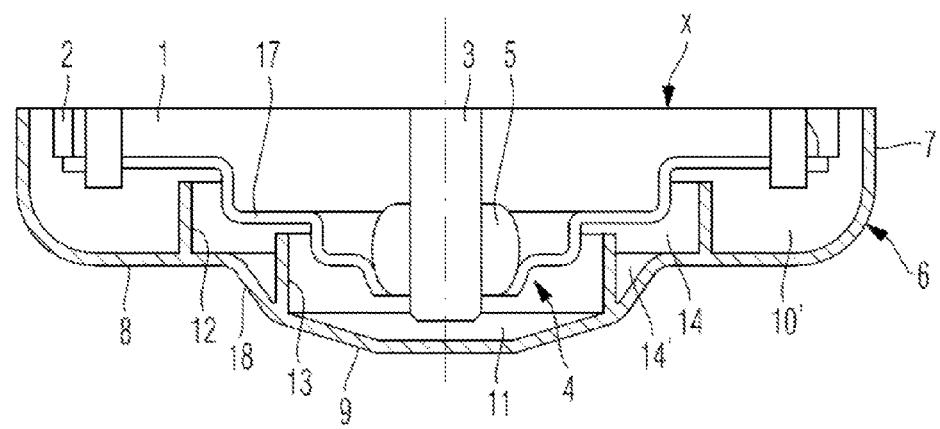
FIG. 3 is a schematic sectional view of the lower portion of a second embodiment of an electric machine and of the motor holder of the invention according to FIG. 2.

FIG. 2 is a schematic sectional view of the lower portion of a first embodiment of an electric machine and of a motor holder according to the invention, and FIG. 3 shows a second embodiment of an electric machine. The embodiments differ only in the configuration of the bearing bracket 17, so that the description of FIG. 2 also applies to FIG. 3.

The bearing bracket 17 is formed, for example, from sheet steel and has in the centre a moulding for the bearing 4 which, in this case, is a cup and ball bearing with a bearing box 5 (sliding bearing) in which the lower end of the armature shaft 3 is mounted. The motor holder 7 is adapted with its lower region, shown here, to the outer contour of the bearing bracket 17. Arranged at a transition from the intermediate floor 8 to the floor 9, upstream of a rounded transitional portion 18, is an encircling first annular wall 12 which defines a storage space 10' of the interior 10 of the motor holder 6. The first annular wall 12 extends in the direction of the longitudinal axis of the electric machine 1, ending just before the outer surface of the bearing bracket 17, with only a small spacing being present.

Arranged at the end of the transitional portion 18 from the intermediate floor 8 to the floor 9 at a transition to the floor 9 is an encircling second annular wall 13 which, like the first annular wall 12, extends in the direction of the longitudinal axis of the electric machine 1. In this configuration, shown in FIG. 2, of the electric machine 1, there is a greater spacing between the upper edge of the second annular wall 13 and the bearing bracket 17. In the second embodiment of the motor according to FIG. 3, this spacing is the same size as the spacing between the first annular wall 12 and the bearing bracket 17.

In the region of the transitional portion 18 between the first annular wall 12 and the second annular wall 13, a secondary storage space 14 is defined by these two annular walls and by the transitional portion 18. In this secondary storage space 14, a rounded edge in the transition to the floor 9 forms with the second annular wall 13 a surrounding gap 14'.

If, for example, water, for instance condensation water which has also formed on the surfaces of the housing 2 and of the outer wall 7 then penetrates into the interior 10 between the housing 2 and the outer wall 7 of the motor holder 6, this water collects in the storage space 10 which forms a first storage reservoir. The water is prevented from flowing away or penetrating inside the bearing region 11 by the first annular wall 12. If a level rises to such an extent in the storage space 10' that the water flows over the edge of the first annular wall 12, the overflowing content of the storage space 10' flows into the secondary storage reservoir 14, initially into the gap 14', where it is prevented from penetrating inside the bearing region 11 by the second annular wall 13. The short spacing between the first annular wall 12 and the bearing bracket 17 produces a type of labyrinth seal for penetrating water and also for foreign bodies, such as dust and dirt. Thus, the first annular wall 12 forms an outer waterproofing wall and the second annular wall 13 forms a further waterproofing wall. The motor holder 6 with its two annular walls 12 and 13 can be used for the first configuration and for the second configuration of the electric machine 1.

Figure 4:
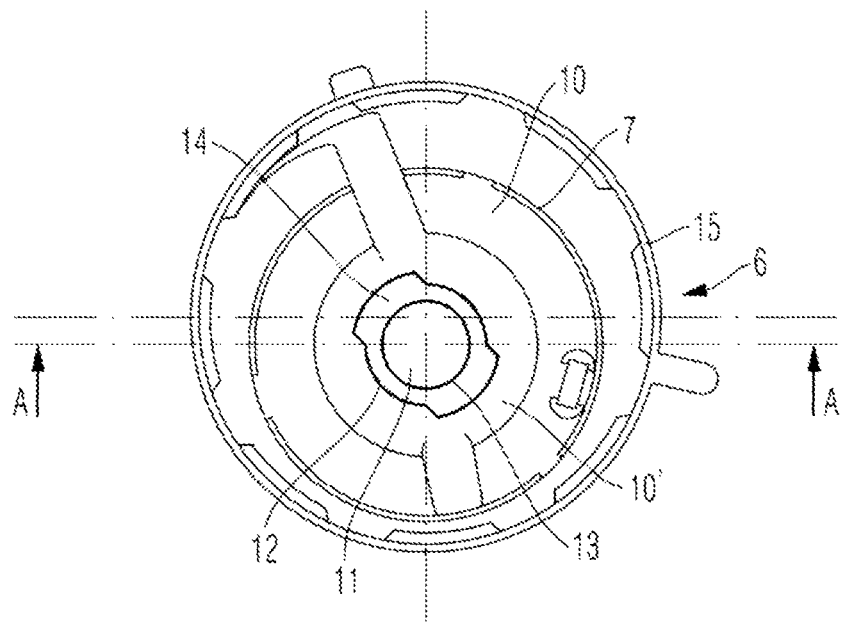
FIG. 4 is an interior view of a first embodiment of the motor holder according to the invention.
Figure 5:
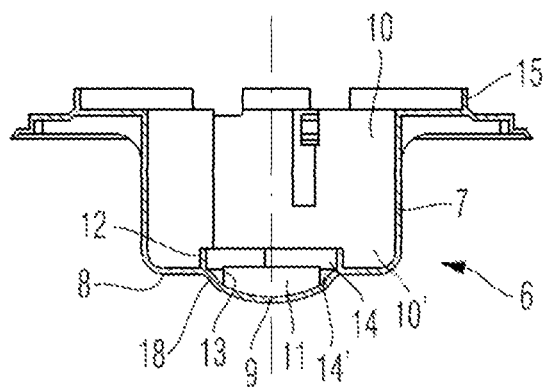
FIG. 5 is a sectional view along line A-A from FIG. 4.

FIG. 4 is an interior view of a first embodiment of the motor holder 6 according to the invention with the annular walls 12 and 13, and FIG. 5 is a sectional view along line A-A from FIG. 4. In this example, a collar 15 is attached eccentrically to the outer wall 7 of the motor holder 6. The shape of the second annular wall 13 is configured such that the projected area of the bearing region 11 is circular, while the shape of the first annular wall 12 is configured such that the projection area of the secondary storage space 14 is delimited by two opposite curved portions each having different radii and the circle of the second annular wall 13.

Figure 6:
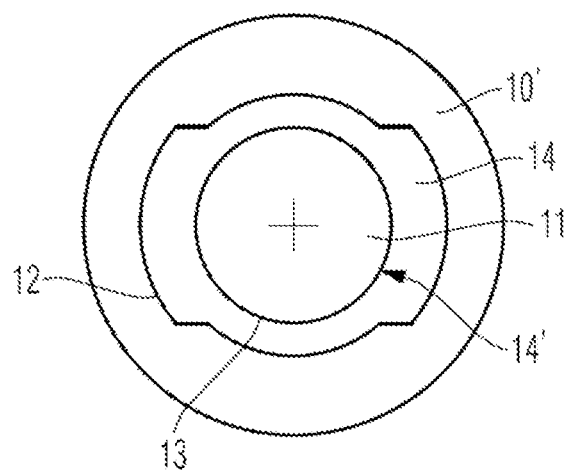
FIG. 6 is an enlarged partial interior view of the lower portion according to FIG. 5.

FIG. 6 shows this shape of the annular wall 13 in an enlarged view. The different curved portions of the first annular wall 12 are interconnected by straight portions.

Figure 7:
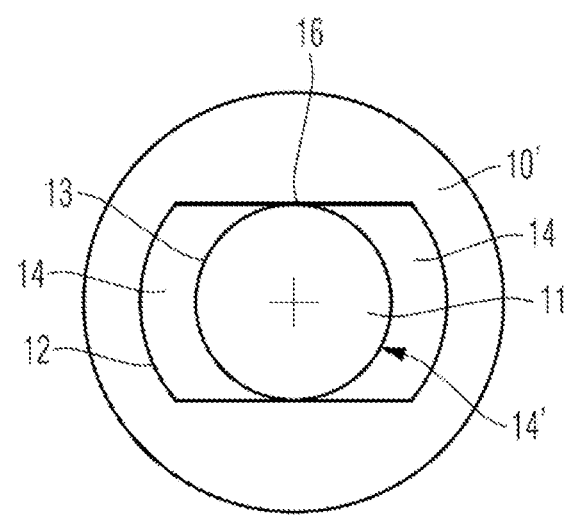
FIG. 7 is an enlarged partial interior view of a lower portion of a second embodiment of the motor holder according to the invention.

In contrast to this, FIG. 7 is an enlarged partial interior view of a lower portion of a second embodiment of the motor holder 6 according to the invention with a circularly encircling second annular wall 13. The first annular wall 12 having two opposing curved portions and two straight portions connecting these curved portions forms with the second circular annular wall a secondary storage reservoir 14 which consist of two annular portions. This secondary storage reservoir 14 has a smaller filling capacity than that of the first embodiment according to FIG. 6.

The present invention is not restricted to the above specific or abstract embodiments, but can be modified in any manner, without thereby departing from the subject-matter of the present invention. Thus, for example, more than two annular walls can be provided. Furthermore, the invention is not restricted to electric machines, such as motors and generators. Of course, it is also possible for other corrosion-prone components, such as electromagnets, to be supported and protected by a motor holder of this type.

LIST OF REFERENCE NUMERALS AND CHARACTERS

1 electric machine
2 housing
3 armature shaft
4 bearing
5 bearing box
6 motor holder
7 outer wall
8 intermediate floor
9 floor
10 interior
10' storage space
11 bearing region
12 first annular wall
13 second annular wall
14 secondary storage space
14' gap
15 collar
16 contact portion
17 bearing bracket
18 transitional portion
A, X sectional lines

The invention claimed is:

1. A motor holder for receiving a bearing of an electric machine, the motor holder comprising:
a surrounding outer wall,
an intermediate floor joined to the surrounding outer wall, and
a floor for receiving a bearing, which floor is moulded in the intermediate floor and is joined to the intermediate floor by a transitional region,
wherein the transitional region has an encircling first annular wall and at least one encircling second annular wall which form an annular storage space provided in the transitional region,
wherein the first and the at least one second annular wall form a labyrinth-type seal with a bearing bracket of an electric machine which is to be associated with the motor holder.

2. The motor holder of claim 1, wherein the first and at least one second annular wall are each of the same height.

3. The motor holder of claim 1, wherein the at least one first annular wall and a portion, associated therewith, of the outer wall define a further storage space.

4. The motor holder of claim 1, wherein the transitional region is delimited in the transition to the intermediate floor by at least one encircling first annular wall and is delimited in the transition to the floor by at least one encircling second annular wall.

5. The motor holder of claim 1, wherein the at least one second annular wall defines with the floor a bearing region provided for the bearing of the electric machine.

6. An electric machine, the electric machine comprising:
a housing which contains an end having a bearing bracket which has a bearing which is at least partly open outwards, and
a motor holder for receiving a bearing of an electric machine, the motor holder comprising:
a surrounding outer wall,
an intermediate floor joined to the surrounding outer wall, and
a floor for receiving a bearing, which floor is moulded in the intermediate floor and is joined to the intermediate floor by a transitional region,
wherein the transitional region has an encircling first annular wall and at least one encircling second annular wall which form an annular storage space provided in the transitional region,
wherein the motor holder is arranged over the end of the housing having the bearing bracket, the bearing being arranged in the bearing region of the motor holder,
wherein the first and the at least one second annular wall form a labyrinth-type seal with a bearing bracket of an electric machine which is to be associated with the motor holder.

7. The electric machine of claim 6, wherein the first and the at least one second annular wall extend substantially in the direction of the longitudinal axis of the electric machine.

8. The electric machine of claim 6, wherein the first and the at least one second annular wall form a labyrinth-type seal with the bearing bracket.

9. The electric machine of claim 6, wherein the electric machine is a component of an air conditioning system of a motor vehicle.

10. The electric machine of claim 6, wherein the first and at least one second annular wall are each of the same height.

11. The motor holder of claim 1, wherein the at least one first annular wall and a portion, associated therewith, of the outer wall define a further storage space.

12. The motor holder of claim 1, wherein the transitional region is delimited in the transition to the intermediate floor by at least one encircling first annular wall and is delimited in the transition to the floor by at least one encircling second annular wall.

13. The motor holder of claim 1, wherein the at least one second annular wall defines with the floor a bearing region provided for the bearing of the electric machine.

* * * * *